(12) United States Patent
Tang et al.

(10) Patent No.: US 10,171,429 B2
(45) Date of Patent: Jan. 1, 2019

(54) PROVIDING SECURITY TO VIDEO FRAMES

(71) Applicant: ARRIS Enterprises LLC, Suwanee, GA (US)

(72) Inventors: Polly Tang, San Diego, CA (US); Rafie Shamsaasef, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 184 days.

(21) Appl. No.: 15/179,870

(22) Filed: Jun. 10, 2016

(65) Prior Publication Data
US 2016/0366107 A1  Dec. 15, 2016

Related U.S. Application Data

(60) Provisional application No. 62/174,843, filed on Jun. 12, 2015.

(51) Int. Cl.
| H04L 29/06 | (2006.01) |
| H04L 29/08 | (2006.01) |
| H04N 21/61 | (2011.01) |
| H04N 21/4408 | (2011.01) |
| H04L 9/06 | (2006.01) |
| H04N 19/00 | (2014.01) |
| H04N 21/845 | (2011.01) |
| H04N 21/854 | (2011.01) |

(52) U.S. Cl.
CPC .......... *H04L 63/0428* (2013.01); *H04L 9/065* (2013.01); *H04L 65/601* (2013.01); *H04L 67/02* (2013.01); *H04N 19/00* (2013.01); *H04N 21/4408* (2013.01); *H04N 21/6125* (2013.01); *H04N 21/8456* (2013.01); *H04N 21/85406* (2013.01)

(58) Field of Classification Search
CPC ... H04L 63/0428; H04L 9/065; H04L 65/601; H04L 67/02; H04L 19/00; H04L 21/4408; H04L 21/6125; H04L 21/8456; H04L 21/85406
See application file for complete search history.

(56) References Cited

U.S. PATENT DOCUMENTS

| 2013/0318347 | A1* | 11/2013 | Moffat | H04L 63/08 713/168 |
| 2014/0244763 | A1* | 8/2014 | Su | H04L 67/1057 709/205 |
| 2015/0019694 | A1* | 1/2015 | Feng | H04L 65/601 709/219 |
| 2015/0341449 | A1* | 11/2015 | Lee | H04L 51/08 709/203 |

(Continued)

Primary Examiner — Ghodrat Jamshidi
(74) Attorney, Agent, or Firm — Thomas A. Ward

(57) ABSTRACT

A method and system are provided for processing a media stream including at least a portion of a media program in a player executed by a computer. The player is configured for: (a) receiving the media stream, wherein the media stream is comprised of one or more chunks; (b) subdividing the chunks into one or more packets, wherein one or more of the packets include video data; (c) obfuscating or de-obfuscating at least some of the video data; and (d) concatenating the video data into one or more frames for playback by the player.

17 Claims, 9 Drawing Sheets

(56) References Cited

U.S. PATENT DOCUMENTS

| | | | |
|---|---|---|---|
| 2016/0021164 A1* | 1/2016 | Chakarapani | H04L 65/607 709/224 |
| 2016/0117511 A1* | 4/2016 | Freitas Fortuna Dos Santos | H04L 63/0435 713/189 |
| 2016/0234275 A1* | 8/2016 | Kuwata | H04W 4/18 |
| 2016/0296269 A1* | 10/2016 | Rubinsky | C25B 1/26 |
| 2016/0357493 A1* | 12/2016 | Zerwas | G06F 3/1438 |

* cited by examiner

FIG. 7

PROVIDING SECURITY TO VIDEO FRAMES

CROSS-REFERENCE TO RELATED APPLICATION

This application claims the benefit under 35 U.S.C. § 119(e) of U.S. Provisional Patent Application No. 62/174,843, entitled "PROVIDING SECURITY TO VIDEO FRAMES," by Polly Tang, Rafie Shamsaasef, and Paul Moroney, filed Jun. 12, 2015, which application is incorporated by reference herein.

BACKGROUND

1. Field of the Invention

The present invention relates to systems and methods for recording and playing back media programs embodied in media streams, and in particular to a system and method for secure storage and retrieval of video frames temporarily stored in queues and buffers.

2. Description of the Related Art

Compression technologies have made the storage and transmission of media programs having audiovisual information to consumers feasible. Such video compression techniques, hereinafter generically referred to as compressed packetized transport (CPT) techniques, typically break the media program into a plurality of frames that are compressed using spatial and/or temporal encoding techniques. One example of a CPT is the H.264 standard, which is an MPEG-4 Part 10, Advanced Video Coding (MPEG-4 AVC) standard that is described in more detail at www.en.wikipedia.org/wiki/H.264/MPEG-4_AVC.

Compressed media programs can be transmitted via satellite, cable, terrestrial wireless transmission, or the Internet, or received in analog form and compressed locally. Once received by a suitable device, the media programs may be decoded and/or decrypted (if encoded and/or encrypted) and provided to a display device for presentation to the user.

The transmission of such media programs is often accomplished by use of HLS (HTTP Live Streaming), which is an HTTP (hypertext transfer protocol) based media streaming protocol that works by breaking up an incoming media stream into a sequence of small HTTP-based file downloads known as chunks, with each chunk being a small portion of a potentially unbounded transport stream. More information on HLS can be found at www.en.wikipedia.org/wiki/HTTP_Live_Streaming.

To ensure that media program recordings are not subjected to unauthorized use, they are typically encrypted before transmission and storage, for example, using an AES-128 CBC (Advanced Encryption Standard, 128 bit key length, Cipher Block Chaining) encryption with PKCS7 (Public Key Cryptography Standard #7) padding, which are described at www.en.wikipedia.org/wiki/Advanced_Encryption_Standard and www.en.wikipedia.org/wiki/PKCS, respectively. However, there may still remain instances during processing where the media program is temporarily stored in an unencrypted form in queues or buffers.

In view of the foregoing, there is a need for systems and methods for securely storing the contents of queues and buffers in a form that prevents unauthorized access but does not impede the processing of the media programs. This disclosure describes systems and methods that satisfy that need.

SUMMARY

To address the requirements described above, the present invention discloses a method and apparatus for processing a media stream comprising at least a portion of a media program in a player executed by a computer. The player is configured for: (a) receiving the media stream, wherein the media stream is comprised of one or more chunks; (b) subdividing the chunks into one or more packets, wherein one or more of the packets include video data; (c) obfuscating or de-obfuscating at least some of the video data; and (d) concatenating the video data into one or more frames for playback by the player. The frame is stored in a queue after the video data is concatenated, prior to being decoded and rendered by the player, wherein the video data is obfuscated or de-obfuscated before or after being concatenated into frames. Thereafter, the video data is de-obfuscated when the frame is retrieved from the queue prior to being decoded and rendered by the player.

The obfuscation or de-obfuscation is performed using an n-tuple bijection function, wherein n is a periodicity of obfuscation and n is configurable.

In one embodiment, the chunks in the media stream are obfuscated and encrypted before being transmitted to the player, and then are generally or selectively de-obfuscated in the player after being decrypted. In another embodiment, the chunks in the media stream are encrypted but not obfuscated before being transmitted to the player, and then are generally or selectively obfuscated in the player after being decrypted.

In the general case, all of the video data is obfuscated and de-obfuscated. In the selective cases, only some of the video data is obfuscated and de-obfuscated.

In one selective approach, the video data is obfuscated and de-obfuscated using an odd and even approach where only the video data in an odd or even numbered frame is obfuscated or de-obfuscated.

In another selective approach, the video data is obfuscated and de-obfuscated using a skip and select approach where only the video data in one or more of the packets is obfuscated or de-obfuscated. Moreover, only a portion of the video data in one or more of the packets may be obfuscated or de-obfuscated. In addition, only a first occurrence of a packet with a data length divisible by a periodicity of obfuscation may be obfuscated or de-obfuscated, wherein a header of the packet is de-obfuscated to determine whether the packet has a data length divisible by the periodicity of obfuscation.

In another selective approach, the video data is obfuscated and de-obfuscated using a caption handling with skip and select approach where only the video data in a first set of packets is de-obfuscated so that caption data is extracted. Moreover, only a first occurrence of a packet following the caption data with a data length divisible by a periodicity of obfuscation may be obfuscated or de-obfuscated. In addition, only a packet identified by a pseudo-random number may be obfuscated or de-obfuscated. Finally, only packets not containing video data may be de-obfuscated, and only packets not solely containing video data may be de-obfuscated.

BRIEF DESCRIPTION OF THE DRAWINGS

Referring now to the drawings in which like reference numbers represent corresponding parts throughout:

FIG. 7 is a block diagram illustrating the obfuscation of video data that takes place in almost every video frame, but only at the first occurrence of video data from a packet storing caption data with a video data size in alignment with the periodicity of obfuscation.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Storage and Streaming Playback of Media Programs

Figure 1:
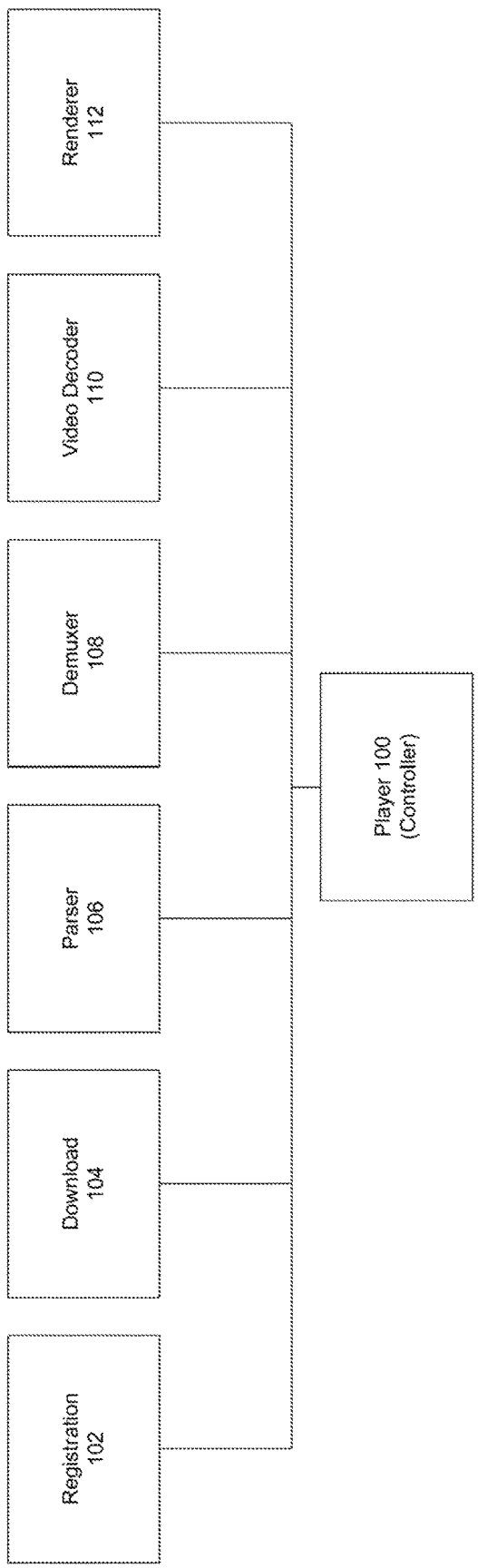
FIG. 1 is a diagram illustrating one embodiment of a media program player, according to one embodiment.

FIG. 1 is a diagram of a player 100, which is used for playback of media programs. The player 100 is a controller that spawns a number of different components: registration 102, download 104, parser 106, demuxer 108, video decoder 110 and renderer 112. Upon successfully registration 102 with a server (not shown), a media program is downloaded 104 using HLS via the Internet in the form of chunks, which are encrypted. The encrypted chunks are parsed by the parser 106, and decrypted and/or demultiplexed by the demuxer 108, into Transport Stream Packets (TSPackets), the format of which is described at www.en.wikipedia.org/wiki/MPEG_transport_stream. The demuxer 108 also reformats the TSPackets into H264 video frames, which are then queued. The video decoder 110 obtains its H264 video frames from the queue, and the renderer 112 renders RGB video frames from the output of the video decoder 110.

In one embodiment, the player 100 may temporarily store the decrypted chunks, or portions of chunks, "in the clear," i.e., without encryption or obfuscation, within a queue in the demuxer 108 for some period of time, e.g., over several seconds. This could be a potential location where hackers can take advantage of the H264 video frames waiting to be consumed by the video decoder 110. Specifically, an H264 video frame stored in the clear for more than a few seconds within the demuxer 108 queue waiting to be picked up by the video decoder 110 could be vulnerable.

Figure 2:
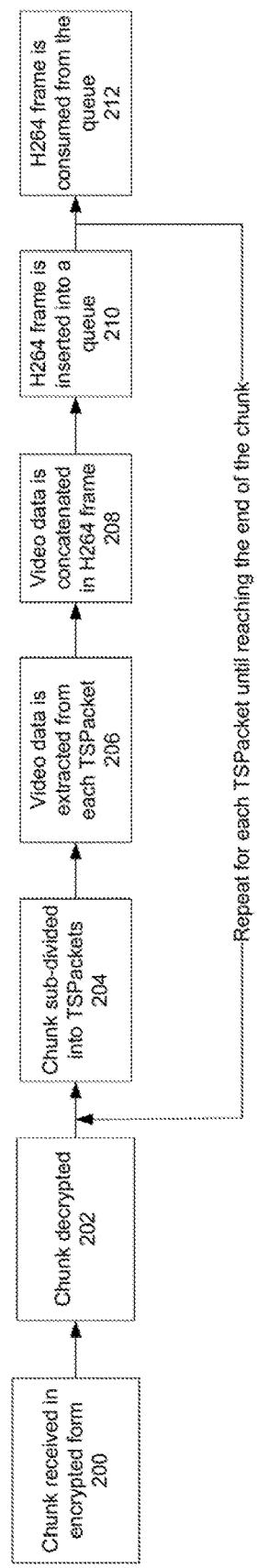
FIG. 2 is a block diagram illustrating the timing of events within the media program player, according to one embodiment.

FIG. 2 is a block diagram illustrating the timing of events within the player 100, according to one embodiment. Specifically, FIG. 2 shows a chunk received in encrypted form (200), decrypted (202), and then sub-divided into TSPackets (204). Each TSPacket is processed in turn, wherein its video data is extracted (206). The video data is concatenated to form an H264 video frame (208) and the H264 video frame is inserted into a queue (210). This sequence repeats for each TSPacket until reaching the end of the chunk. Then, the H264 video frame is consumed from the queue (212).

In an HLS stream environment for High Definition (HD) video at a resolution of 720p or 1080p, the video decoder 110 must retrieve or consume from the demuxer 108 queue at the following rates:

HD 720p @ H264 high profile 2500 kbps (20 MB/minute), which is 312 Kbytes per second.

HD 1080p @ H264 high profile 5000 kbps (35 MB/minute), which is 625 Kbytes per second.

It is reasonable to assume that the demuxer 108 queue, which acts as a buffer of the H264 video frames, must store at least a couple of seconds of H264 video frames to avoid dropouts, jitter, stuttering and the like. Consequently, if video data is left unprotected in the queue for about 2 seconds, there will be at least 625 Kbytes of video data (in an HD 720p stream) or 1250 Kbytes of video data (in an HD 1080p stream) in the queue. Based on this, it would be best to not let a hacker consistently obtain the unprotected H264 video frames from the queue (i.e., the same location).

With regard to the HLS, it has been determined that the chunk size is always large, not the same for each chunk, but always divisible by 16. This is to allow the decryption (e.g., AES-128 CBC) to be performed. A chunk contains one or more TSPackets, each having a size of 188 bytes with a 4-byte header and 184 bytes of data. Moreover, a TSPacket of size 188 will align with the beginning of each chunk, such that the number of TSPackets contained within a chunk is =Size of Chunk/188 with any remaining bytes comprising PKCS7 paddings.

As noted above, each H264 video frame is a concatenation of the video data portion of one or more TSPackets. It has also been determined that the largest H264 video frame could be more than 38,000 bytes in size, and that it is not uncommon to see compressed H264 video frames that are larger than 10,000 bytes. On the other hand, the final length of each H264 video frame is never known until reaching the end of the processing within the demuxer 108.

For most of the time, but not necessarily all of the time, the concatenation follows a pattern such that a first TSPacket and a last TSPacket can store video data having an arbitrary length less than 184 bytes, while the remaining TSPackets therebetween store video data with a length of 184 bytes. Extra care has to be exercised during extraction of the video data from the TSPackets, in order to preserve the obfuscation alignment, which may add bytes, such that concatenation of the video data from the TSPackets into the H264 video frame is performed correctly.

In view of the processing time for concatenating the video data from the TSPackets and the queueing time for each H264 video frame waiting to be consumed by the video decoder 110, there is no added burden in performing obfuscation/de-obfuscation functions on the video data to provide extra security protection. It has been determined, for example, that an obfuscation function may add about 2 milliseconds (ms) to the processing time of the demuxer 108. However, depending on the approach used, it is likely that the obfuscation function will have no impact on queueing time.

On the other hand, another objective is to ensure that a de-obfuscation function performed on the obfuscated video data does not add to the processing time of the video decoder 110 or renderer 112. Specifically, retrieval of the video data and conversion from obfuscated video data to a clear form of video data by the video decoder 110 must not slow down the video decoder 110 or cause distortion to the rendering 112.

Therefore, for an efficient design of obfuscating the video data in an H264 video frame, a selective approach in obfuscating video data would be preferred over a simple "brute force" approach, which obfuscates all of the video data in the H264 video frame. Both the simple and selective approaches are described in more detail below.

Each of these approaches, however, do not disturb existing functions of the player 100. Specifically, the proposed approaches are designed to work collaboratively with existing functions, while minimizing the extra processing time within the player 100

Obfuscation of Video Data

As noted above, decrypted HLS chunks are considered valuable assets once they have been downloaded by devices. It is important to prevent the decrypted HLS chunks from falling into the hands of hackers. The protection process starts from the time of decrypting the HLS chunks by the demuxer 108, the formation of H264 video frames, and up to the time before the H264 video frames are consumed by the video decoder 110. Once the H264 video frame has been consumed by the video decoder 110 and is rendered 112 into an RGB video frame, it becomes less valuable because of the size of RGB video frames.

Various methods have been developed to have the H264 video frames remain obfuscated following decryption for as long as possible, until they are consumed by the video decoder 110. In one embodiment, n-tuple bijection is used for the obfuscation/de-obfuscation functions.

In mathematics, a bijection, also known as a bijective function or one-to-one correspondence, is a function between the elements of two sets having n tuples, where each element of one set is paired with exactly one element of the other set, and each element of the other set is paired with exactly one element of the first set, such that there are no unpaired elements.

An n-tuple can be represented as (x1, . . . , xn), it could have x i=x j for i≠j and each x i is a byte. Consider an n-tuple bijection function for the set X, f: X→X, where each element of X will map to a single element in X. For example, when n=4, A is an element of X, with A=(0x1, 0x2, 0x1, 0xFE), and f(A)=B, with B=(0x4, 0x3C, 0x2, 0x1) is also an element of X and f(B)=A. This demonstrates the bijective nature in obfuscation and de-obfuscation.

Note that the periodicity of the bijection function is the value n. Note also that it is desirable to have a value of n>1 for n-tuple bijection, since a larger value of n makes it more difficult to reverse engineer the function. However, the complexity of joining obfuscated data increases with the value of n. The value of n is configurable to balance complexity of this operation to achieve better performance. The complexity includes the adding of padding to each piece of obfuscated video data within the TSPacket with length not divisible by n. It also involves the removal of previous paddings either entirely or partially after each joining, since the post-join length has changed. It then follows by adding new paddings to match the new data length.

The details of each approach to obfuscation and de-obfuscation are described in more detail below. Note that, in each of these approaches, the received chunk may be encrypted but not obfuscated, or may be both encrypted and obfuscated. Moreover, the demuxer 108 may obfuscate or de-obfuscate each TSPacket as necessary.

1) Simple Approach

Figure 3:
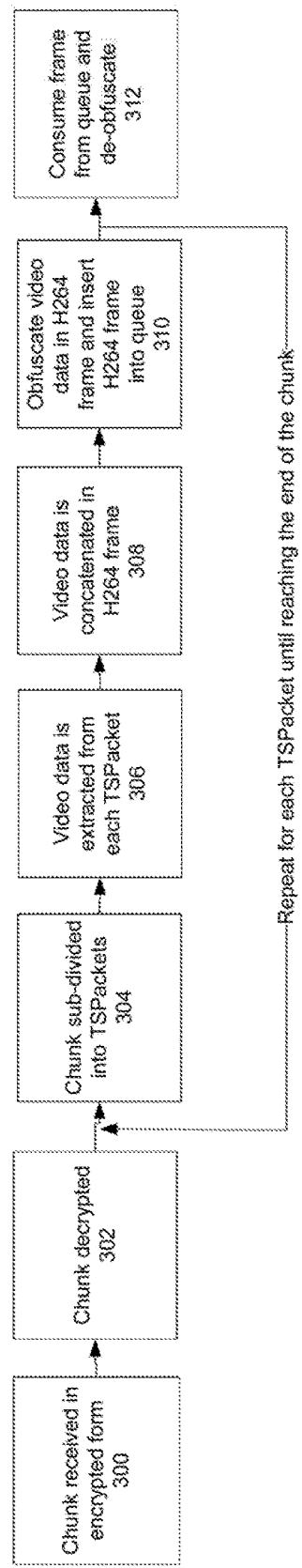
FIG. 3 is a block diagram that illustrates a simple approach to obfuscation and de-obfuscation within the media program player, according to one embodiment.

FIG. 3 is a block diagram that illustrates a simple approach to obfuscation within the player 100, according to one embodiment. Specifically, FIG. 3 shows a chunk received in encrypted form (300), decrypted (302), and then sub-divided into TSPackets (304). Each TSPacket is processed in turn, wherein its video data is extracted (306). The video data is concatenated to form an H264 video frame (308). The H264 video frame data is obfuscated (by the demuxer 108, if necessary) and the H264 video frame is inserted into a queue (310). This sequence repeats for each TSPacket until reaching the end of the chunk. Then, the H264 video frame is consumed from the queue and the video data in the H264 video frame is de-obfuscated (312). Thereafter, the video data is decoded 110 and rendered 112.

The virtue of this approach is that it simplifies the managing of the decrypted and obfuscated video data and simplifies the processing by the demuxer 108 and the video decoder 110. However, because all of the video data is obfuscated, there is the extra overhead in performing both the obfuscation and de-obfuscation.

2) Odd and Even Approach

Figure 4:
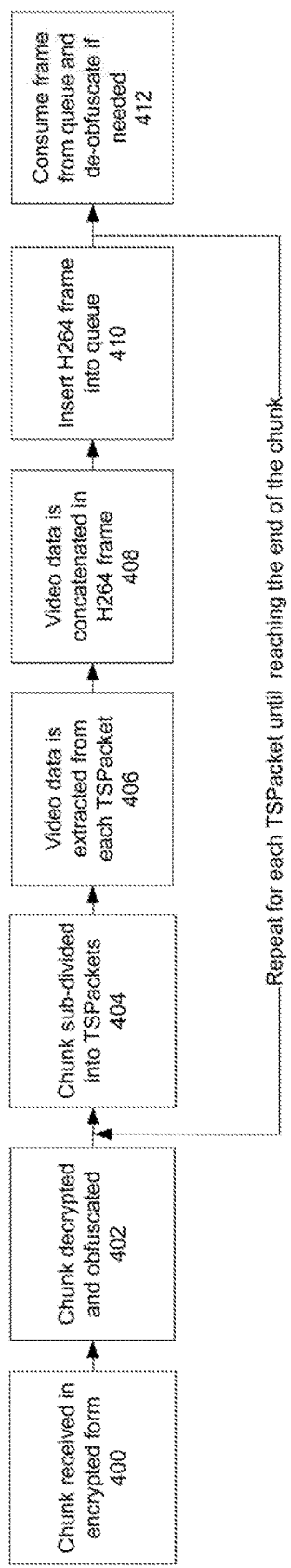
FIG. 4 is a block diagram that illustrates a general selective approach to obfuscation and de-obfuscation within the media program player, according to one embodiment.

FIG. 4 is a block diagram that illustrates a general selective approach to obfuscation within the player 100, according to one embodiment. Specifically, FIG. 4 shows a chunk received in encrypted form (400), wherein the chunk is decrypted but obfuscated (402). The chunk is sub-divided into TSPackets (404), and each TSPacket is processed in turn, wherein its video data is extracted and de-obfuscated as necessary (406). The video data is concatenated to form an H264 video frame (408), and the H264 video frame is inserted into a queue (410). This sequence repeats for each TSPacket until reaching the end of the chunk. Then, the H264 video frame is consumed from the queue and the video data in the H264 video frame is de-obfuscated if necessary (412). Thereafter, the video data is decoded 110 and rendered 112.

Knowing that the most time-consuming manipulation is the joining of obfuscated data of variable length, it is desirable to reduce the time spent on obfuscation or de-obfuscation of the video data. In this embodiment, FIG. 4 also illustrates a specific selective approach to data obfuscation, namely an Odd and Even Approach. In this approach, data obfuscation is performed only on odd or even video frames, which can reduce the processing time in the demuxer 108 by half and subsequently will also reduce the processing time in the video decoder 110 by half.

For example, consider where only odd H264 video frames are obfuscated, until they are consumed by the video decoder 110. The even H264 video frames are queued in the clear. This approach manages to reduce the time for joining obfuscated data of variable length by half in the demuxer 108, as well as the time for de-obfuscation in the video decoder 110. It also manages to successfully protect the decrypted HLS chunks.

Other aspects of the Odd and Even Video Frame Approach include the following:

Assuming an obfuscated chunk has been decrypted by the demuxer 108, the chunk will remain in obfuscated form. Each obfuscated chunk will be processed 188 bytes at a time, which is one TSPacket.

At the beginning of the demuxer 108 processing, it is necessary to implement a loop to extract 188 bytes of obfuscated data at a time. Then, the demuxer 108 will de-obfuscate the first A bytes of obfuscated data from each TSPacket. A is chosen to be a positive integer that is a multiple of n, where n is the periodicity of obfuscation for the n-tuple bijection. This will expose the 4-byte header of the TSPacket into clear as well as the following (A-4) bytes. From the first A bytes of clear data, the player 100 should be able to determine whether the TSPacket stores video data, and the start position of the video data.

Because the start position of the video data can vary in each TSPacket, the demuxer 108 concatenates the obfuscated video data from each TSPacket to form an obfuscated H264 video frame. It is worth mentioning that, due to the complexity arising from the n-tuple bijection, the obfuscated data from each TSPacket cannot be simply concatenated together to form an obfuscated H264 video frame and the video decoder 110 cannot be expected to de-obfuscate the entire H264 video frame all at once. Instead, they have to be massaged/manipulated around the n-tuple bijection before concatenation can occur; otherwise, the de-obfuscated video data will be wrong. Since this massaging/manipulating has to be performed in each TSPacket that stores video data within a chunk, if it is not done properly or selectively, it adds significant overhead to the demuxer 108 and video decoder 110 functions, which are time critical in the player 100.

The Odd and Even Video Frame Approach will allow data to remain obfuscated for each odd H264 video frame, while the even H264 video frames are de-obfuscated or in the clear. (In an alternative embodiment, the odd H264 video frames are de-obfuscated or in the clear, while the even H264 video frames are obfuscated.) Since each chunk contains many TSPackets, and the video data from TSPackets when concatenated together will produce an H264 video frame, therefore, if the player 100 performs concatenation of obfuscated data for the odd H264 video frame, the player 100 can reduce the manipulation time in the demuxer 108 by half. In addition, the player 100 would also want to reduce the overhead from de-obfuscation of H264 video frames at the video decoder 110 stage, so if the player 100 can reduce the number of H264 video frames that needed to be de-obfuscated by half, the player 100 would have improved the efficiency by half.

Figure 5:
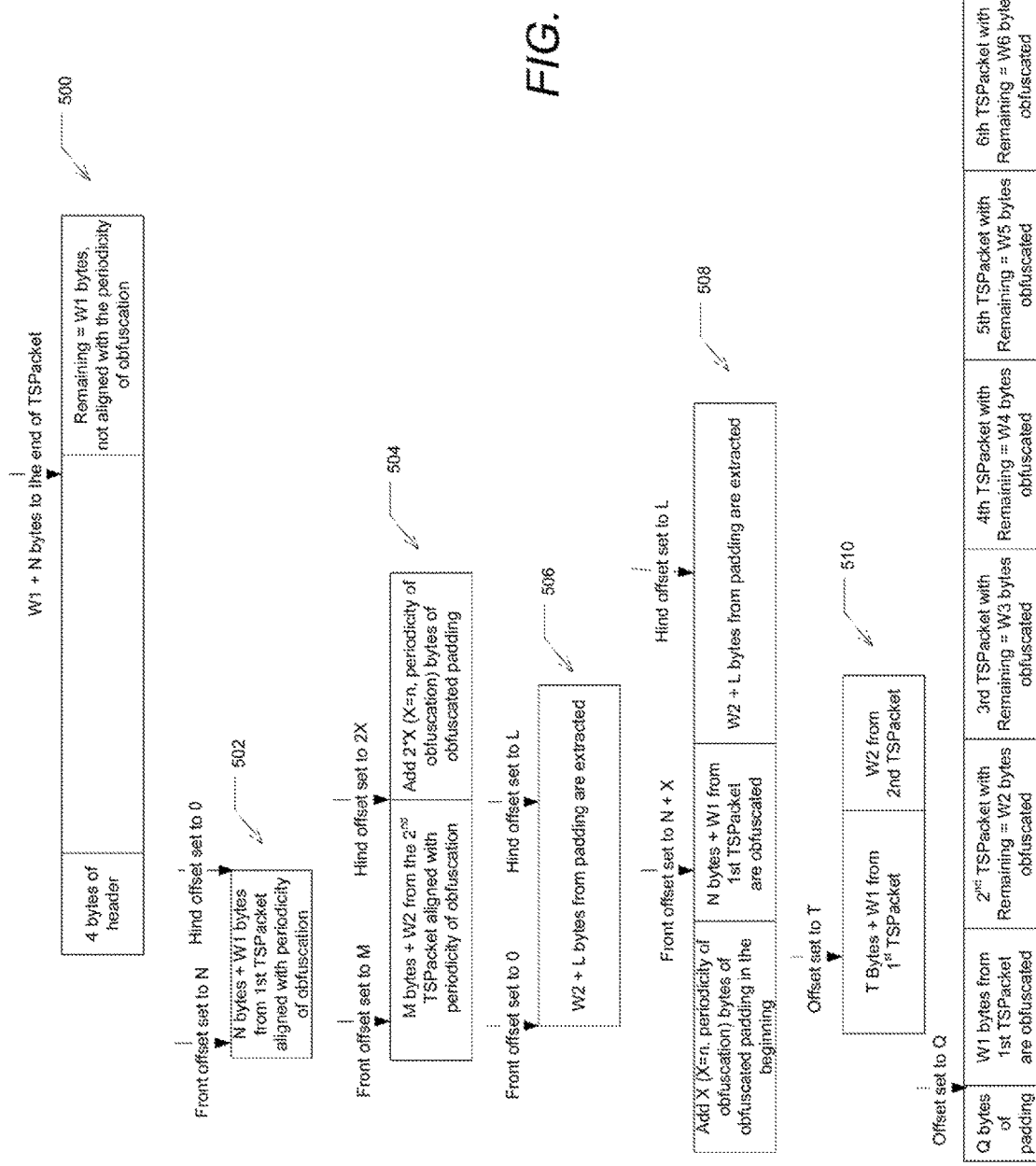
FIG. 5 is a block diagram illustrating the concatenation of obfuscated video data from multiple packets in either an odd or even video frame.

FIG. 5 is a block diagram illustrating the concatenation of obfuscated video data from multiple TSPackets in either an odd or even H264 video frame.

Blocks 500 are a TSPacket that includes video data, and this TSPacket happens to be the first part of the video data in an H264 video frame. From the first A bytes of the TSPacket de-obfuscated into clear, the player 100 can obtain the start position of the video data. In Blocks 500, W1 is the number of bytes of video data that is contained inside the TSPacket. The term "Remaining" refers to the number of data bytes contained in the TSPacket, wherein Remaining=W1.

Block 502 represents the length of W1 which, in this case, is not divisible by n (from the n-tuple bijection function). In order to extract the video data portion of this TSPacket, the player 100 has to work with (N+W1) bytes of data, where N is the smallest positive integer number which, when added in front of W1, will produce a length that is divisible by n. The player 100 has the capability to extract (N+W1) bytes counting from the end of the TSPacket.

Blocks 504 illustrate the concatenation of the second piece of obfuscated video data from the next TSPacket to the first piece of obfuscated data in Block 502. Assume that Remaining=W2 bytes and that the length of W2 is not divisible by n; therefore, the player 100 needs to start from M bytes before W2, such that the length of (M+W2) is divisible by n. However, it is also necessary to insert some dummy padding to be appended to the end of (M+W2). This dummy padding (selected to be of length 2*n) is necessary such that when the player 100 extracts the W2 bytes of data in Block 506, the player 100 will remove the M bytes in the beginning, but the player 100 needs to have a pad of L bytes to the end of W2, so that (W2+L) bytes is again divisible by n. Note that L is the smallest positive integer that when added to the W2 will be divisible by n.

Block 506 shows the effect of using the player 100 to remove the M bytes in front of the W2 bytes and the pad of L bytes necessary to be appended to W2 to maintain the divisibility by n.

In Blocks 508, the player 100 needs to prepare the video data from Block 502 for concatenation with the video data in Blocks 506, and this is to be done by adding a dummy padding of X bytes in front of the data from Block 502. For simplicity's sake, the value of X is chosen to be equal to n. Now, the video data and the padding becomes (X+(N+W1)) in bytes. Then, concatenation of the video data (X+(N+W1)) from the first TSPacket with the video data (W2+L) from the second TSPacket will become (X+(N+W1))+(W2+L).

In Blocks 510, the player 100 can remove L bytes from the end of W2 and the player 100 can also remove X+N bytes in front of W1. In the case where the length of (W1+W2) is not divisible by n, the player 100 will have to allow a few bytes in front of W1, such that it becomes (T+W1+W2) with length divisible by n.

In Blocks 512, now the length of (T+W1+W2) is divisible by n. The player 100 continues to extract the video data from the third TSPacket. The player 100 formats the video data in the third TSPacket in a similar fashion as it did with the second TSPacket (in Blocks 504 and 506), say (W3+K), and tries to concatenate this to the end of (T+W1+W2). Using the generality in Blocks 508, the player 100 needs to add a dummy padding of X bytes in front of (T+W1+W2) prior to the concatenation with (W3+K). Now, the player 100 has (X+(T+W1+W2))+(W3+K). Again, the player 100 removes K, X and T, to obtain (Q+W1+W2+W3), which has length divisible by n. The player 100 can repeat Blocks 512 as many time as possible until the entire H265 video frame is formed with the obfuscated data. At the very end, the player 100 may have a residual of Q bytes in front of the concatenated data, and the player 100 must record the number of length of Q for the video decoder 110 stage when the player 100 de-obfuscates the entire odd H264 video frame.

The Odd and Even Video Frame Approach has managed to cut half the work required to preserve the obfuscation, but it is still adding a lot of extra manipulation time to both the demuxer 108 and video decoder 110. Again, this provides a motivation to find an even better solution.

3) Skip and Select Approach

FIG. 4 also illustrates a Skip and Select Approach to obfuscation within the player 100, according to one embodiment.

Experiments have been conducted to evaluate the effectiveness of obfuscating the video data of just a single TSPacket during the construction of a H264 video frame, which may be comprised of data from tens, hundreds or thousands of TSPackets. The results show that without fully de-obfuscating the data of the entire H264 video frame, the rendering 112 will at best continuously contain non-decoded blocks and at worst cannot continue after a short period of time, such as a few seconds.

In one aspect of this approach, it is only necessary to have a single TSPacket's video data remain in obfuscation for a H264 video frame to make the entire HLS media program lose its value. In the future, however, when technology allows extremely fast processing speed in every stage from the demuxer 108 to the video decoder 110, more than a single TSPacket's video data will improve the security of the H264 video frames prior to consumption by the video decoder 110.

In another aspect of this approach, it is also noticed that if the obfuscated video data has a length divisible by n, where n is the periodicity of obfuscation for the n-tuple bijection, the manipulations and/or operations spent on joining of this type of obfuscated data can be significantly reduced.

In another aspect of this approach, the video decoder 110 is the most time critical function of the entire system. In order to minimize the time spent on de-obfuscating video data before the H264 video frame can be consumed by the video decoder 110, only the first occurrence of a TSPacket with a video data length divisible by n will have its data remain in obfuscation. Subsequent TSPackets with a data length divisible by n will still be de-obfuscated.

This is especially important for rendering HD movies, wherein the video decoder 110 consumes a large number of H264 video frames per second in order to maintain the resolution of the HD movie. If there are too many de-obfuscations required, video frames may drop and result in poor rendering 112.

In another aspect of this approach, the start position and the data length of the obfuscated video data within each H264 video frame are tracked by a data structure (Obj_Position, Obj_Length). This helps to minimize the de-obfuscation time during the processing of the video decoder 110. Sometimes, a TSPacket with a video data length divisible by n may have an adaptation field and thus the data length is less than 184 bytes; therefore, it is necessary to store the Obj_Length.

In another aspect of this approach, in order to decide accurately whether the obfuscated data length is divisible by n, the first A bytes of each TSPacket have to be de-obfuscated at the demuxer 108 processing stage, where A is >4, since the first 4 bytes are the header information. Sometimes, if the video data contains an adaptation field, it requires more than the 4 bytes of header to determine the exact data length.

In another aspect of this approach, the choice of A is a value divisible by n. The value of A should not be too large either, so that too much data was de-obfuscated.

Following de-obfuscation of these A bytes, the length of the video data is determined. The video data remains obfuscated if the data length is divisible by n; otherwise, the data is de-obfuscated.

Figure 6:
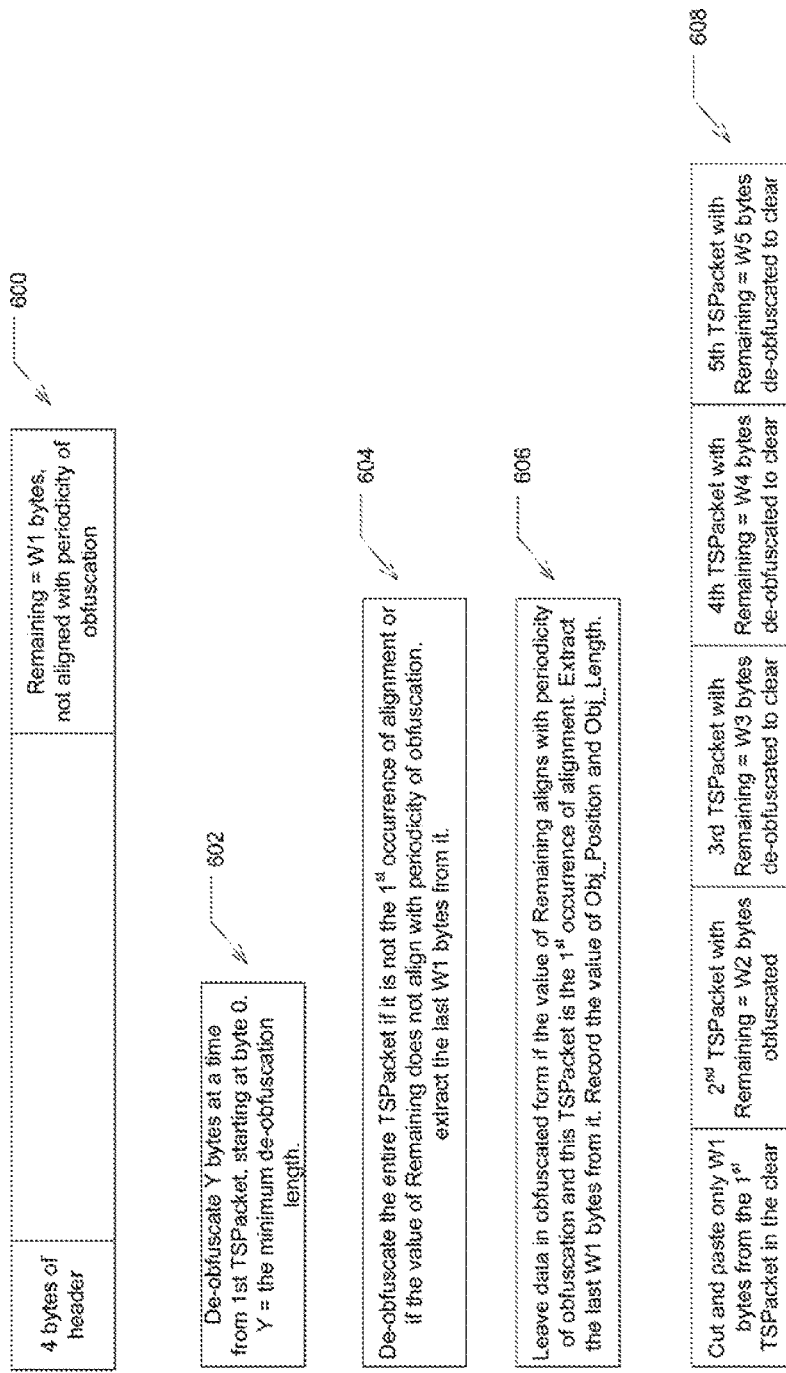
FIG. 6 is a block diagram illustrating the obfuscation of video data that takes place in almost every video frame, but only at the first occurrence of video data from a packet with a video data size in alignment with a periodicity of obfuscation.

FIG. 6 is a block diagram illustrating the obfuscation of video data that takes place in almost every H264 video frame, but only at the first occurrence of video data from a TSPacket with a video data size in alignment with the periodicity of obfuscation, i.e., n.

In order to simplify the processing in the demuxer 108 and video decoder 110, while still maintaining the obfuscation of some of the video data in the H264 video frame, the player 100 makes further simplifications in the de-obfuscation process.

Blocks 600 comprise a first TSPacket, wherein the TSPacket contains W1 bytes of video data. The value of Remaining refers to the video data portion from the end of the TSPacket boundary, wherein Remaining=W1 bytes from the first TSPacket and is not aligned with the periodicity of obfuscation (i.e., W1 is not divisible by n).

In Block 602, for each TSPacket in a chunk, the player 100 performs de-obfuscation from the beginning of the TSPacket, until the player 100 obtains the value of Remaining. As already mentioned in the Odd and Even Approach, the player 100 needs to de-obfuscate some A bytes starting from the beginning, in order to obtain the value of Remaining.

Next, the player 100 forms either Block 604 or 606, depending on the criteria. Block 604 results from de-obfuscating the entire video data in the TSPacket, while Block 606 results from leaving the video data obfuscated in Remaining.

If the number of bytes in Remaining is not divisible by n for the current TSPacket, or if the current TSPacket is not the first occurrence within the current H264 video frame where Remaining is divisible by n, then Block 604 is formed. If the length of Remaining is not divisible by n, then it takes significant massaging/manipulation of data before it can be concatenated with the portion of video data from the next TSPacket, and it is preferable to de-obfuscate it entirely. This also has the advantage that, with partial obfuscation in each H264 video frame, the hacker is not able to reuse the video data.

Block 606 illustrates that, if the length of Remaining is divisible by n, the player 100 does not need any extra effort to massage the video data before it can be concatenated with the video data portion in the next TSPacket; this will save on manipulation in the demuxer 108. Moreover, if the length of Remaining is divisible by n, it takes very little effort to de-obfuscate the video data in the video decoder 110, which is the most time critical function. The player 100 creates a data structure with attributes (Obj_Position, Obj_Length) for each H264 video frame to store the start position of obfuscation and the length in bytes of the obfuscation.

Block 608 is a direct concatenation of W1 (de-obfuscated), W2 (obfuscated), W3 (de-obfuscated), W4 (de-obfuscated) and W5 (de-obfuscated), until the entire H264 video frame is formed. At the video decoder 110 stage, with the knowledge of (Obj_Position, Obj_Length) in the H264 video frame, the player 100 can de-obfuscate the W2 portion efficiently before further processing.

Thereafter, Blocks 602, 604 and 606 are repeated for each TSPacket, wherein concatenation of video data from multiple TSPackets forms an H264 video frame.

4) Caption Handling with Skip and Select Approach:

FIG. 4 also illustrates a Caption Handling with Skip and Select Approach to obfuscation within the player 100, according to one embodiment.

This approach is a modification of the Skip and Select Approach that allows for the extraction of Caption Data, which is buried amongst the video data. Caption Data usually occurs within the first four TSPackets. Recall that the Skip and Select Approach does not keep track of whether the video data that remains in obfuscated form contains Caption Data or not. Caption Data handling poses a new issue to the Skip and Select Approach if it falls within an obfuscated portion of video data.

In one aspect of this approach, the first four TSPackets which contain video data are de-obfuscated without regard to its data length. This is based on the assumption that the Caption Data is normally not very lengthy, will be contained within the first four TSPackets, and is usually located at the beginning of the H264 video frame, if present. This will allow the demuxer 108 to process the Caption Data in the clear, which helps the demuxer 108 locate the start position of the Caption Data once a H264 video frame is formed.

Since the Caption Data may span more than four TSPackets, it is necessary to keep more than just the first occurrence of obfuscated video data after de-obfuscation of the first four TSPackets during the formation of the H264 video frame. This leads to the following aspect of this approach.

In another aspect of this approach, all video data with a length divisible by n will remain in obfuscated form. This requires a link list of the data structure (Obj_Position, Obj_Length) to manage all the obfuscated locations. The link list is sorted by the Obj_Position, i.e., the smallest Obj_Position will be the first element in the link list. Multiple locations of obfuscated data will increase security for the video frames.

After formation of each H264 video frame, the demuxer 108 will process the current H264 video frame to determine the exact start and end position of the Caption Data, and extract the Caption Data. The start position can be identified by a Caption Data signature, which is an 8-byte indicator, and the length of the Caption Data follows the 8-byte indicator. The Caption Data has its own data structure which stores the length of the Caption Data and therefore the end position of Caption Data can be determined.

In another aspect of this approach, only the first element in the sorted link list of the data structure (Obj_Position, Obj_Length) with an Obj_Position larger than the end position of the Caption Data will remain obfuscated. All other elements in the link list will be de-obfuscated and removed from the link list. This is to minimize the work of the video decoder 110, so that the video decoder 110 will only need to de-obfuscate data in one location in each H264 video frame.

Figure 7:
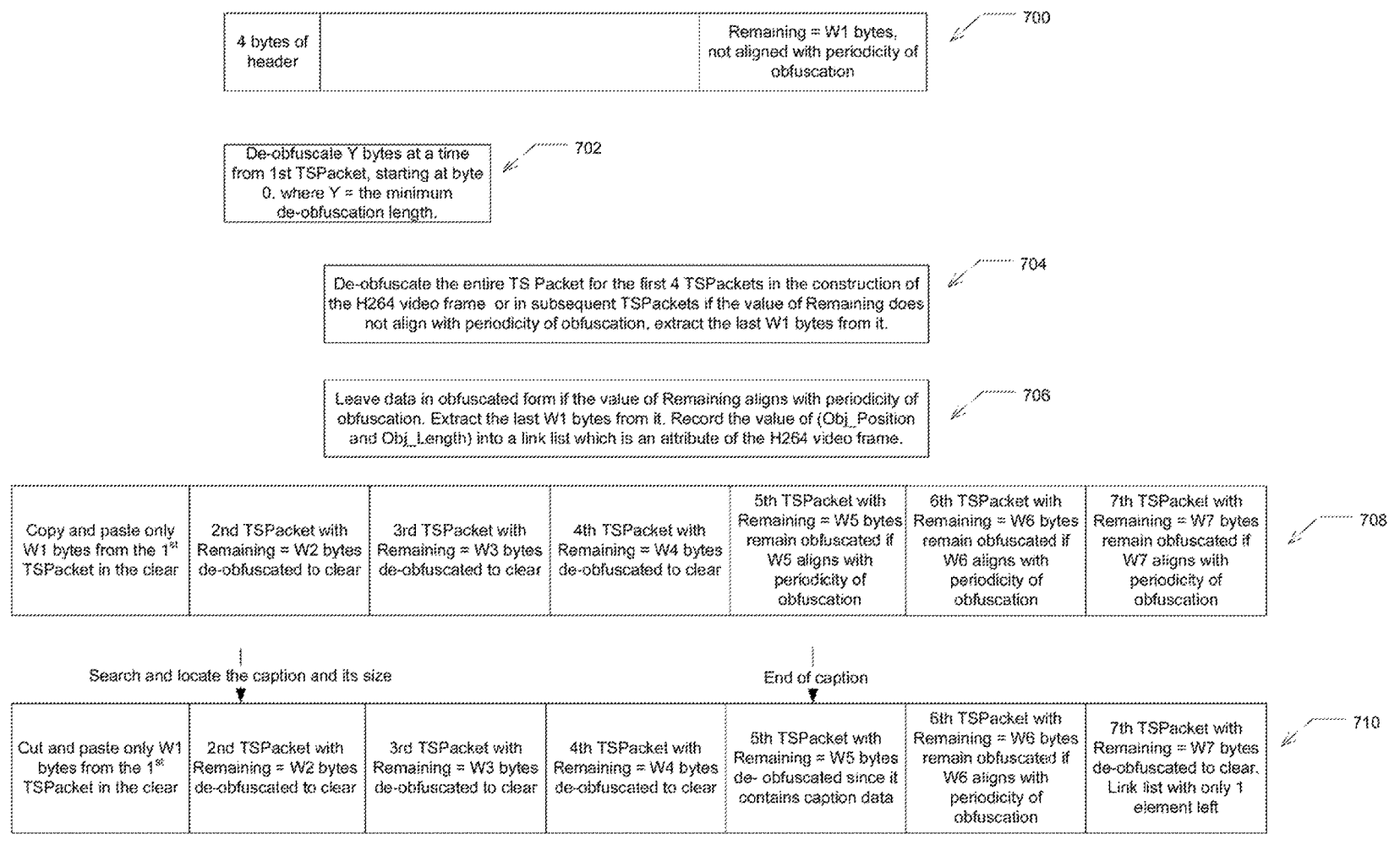

FIG. 7 is a block diagram illustrating the obfuscation of video data that takes place in almost every H264 video frame, but only at the first occurrence of video data from a TSPacket after the Caption with a video data size in alignment with the periodicity of obfuscation, i.e., n.

Blocks 700 comprise a first TSPacket, wherein the TSPacket contains W1 bytes of video data. The value of Remaining refers to the video data portion from the end of the TSPacket boundary, wherein Remaining=W1 bytes from the first TSPacket and is not aligned with the periodicity of obfuscation (i.e., W1 is not divisible by n).

Block 702 represents Y bytes of data de-obfuscated by the player 100, wherein the Y bytes is usually not a large number in comparison to 184 (the TSPacket size), but it will be sufficient for the player 100 to make use of the header information and some more bytes to effectively determine the start position of data. The term Remaining refers to the number of data bytes within a TSPacket.

The player 100 then forms either Block 704 or 706, depending on certain criteria. If the current TSPacket is within the first four TSPackets in the H264 video frame or the Remaining value is not divisible by n, then the player 100 de-obfuscates the entire TSPacket in Block 704; otherwise, the player 100 keeps the obfuscated data intact and also keeps track of the location of obfuscation in the link list of (Obj_Position, Obj_Length).

In Block 708, the player 100 concatenates the video data from each TSPacket, either in obfuscated form or in the clear, without the need for any padding.

In Block 710, the demuxer 108 conducts the necessary Caption Data search, wherein the Caption Data length is made available with the de-obfuscation of the first four TSPackets. The demuxer 108 traverses the sorted link list to determine whether any part of the Caption Data is buried within the obfuscated data. Any obfuscated data that contains Caption Data will be de-obfuscated and the corresponding element removed from the sorted link list. In order to minimize the de-obfuscation processing in the video decoder 110, only one element in the link list will be preserved, which is the element representing the first location after the Caption Data is cleared, and the rest of the elements will be de-obfuscated and removed from the link list.

Figure 8:
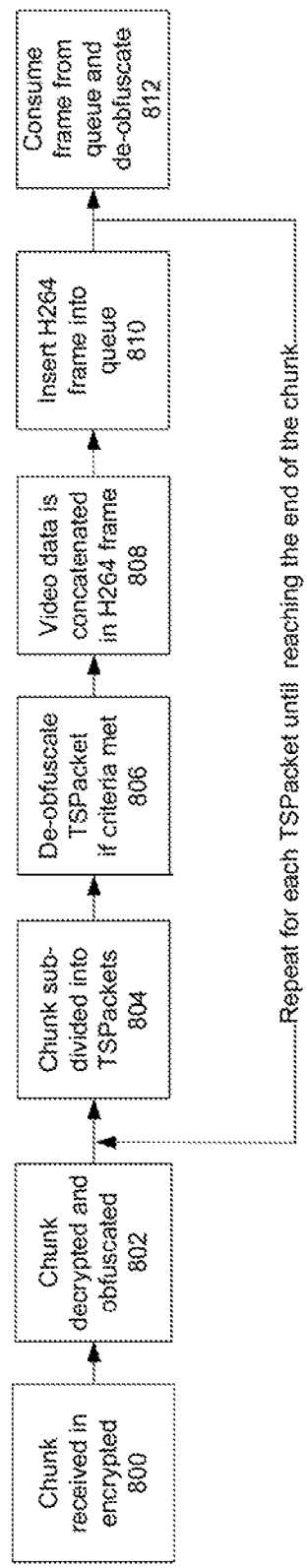
FIG. 8 is a variant of FIG. 4 that illustrates modified caption handling with a skip and select approach to obfuscation within the media program player, according to one embodiment.

5) Modified Caption Handling with Skip and Select Approach:

FIG. 8 is a variant of FIG. 4 that illustrates a Modified Caption Handling with Skip and Select Approach to obfuscation within the player 100, according to one embodiment. Specifically, FIG. 8 shows a chunk received in encrypted form (800), wherein the chunk is then decrypted and obfuscated (802). The decrypted and obfuscated chunk is subdivided into TSPackets (804), and each TSPacket is de-obfuscated if certain criteria are met (806), wherein its data is extracted. The video data is concatenated to form an H264 video frame (808). The H264 video frame is inserted into a queue (810). This sequence repeats for each TSPacket until reaching the end of the chunk. Then, the H264 video frame is consumed from the queue and the video data in the H264 video frame is de-obfuscated (812). Thereafter, the video data is decoded 110 and rendered 112.

This approach improves upon the Caption Handling with the Skip and Select Approach by making use of a "ContainsPESHeader" flag from the header information of the TSPacket, to determine, ahead of time in the demuxer 108, whether a TSPacket contains Caption Data or not. If the TSPacket contains Caption Data, the player 100 will de-obfuscate the entire TSPacket.

Moreover, for each H264 video frame, the demuxer 108 uses a pseudo-random number generator to generate a natural number, R, within the range of 1 to M, where M is a natural number and M>=R. The randomness of R will make sure that the location of obfuscation will be different in each H264 video frame, making it more robust against a hacker trying to de-obfuscate the video frames.

As shown in FIG. 8, the demuxer 108 will de-obfuscate the entire TSPacket (806), if any of the following criteria is met:

a. The TSPacket header information shows that this particular TSPacket does not carry any payload, which implies it does not contain video data. The demuxer 108 can immediately de-obfuscate the entire TSPacket before it is passed to the next stage for any further processing.

b. The TSPacket header information shows that this particular TSPacket has the "ContainsAdaptationField" flag set to true, which implies that the payload is shorter than 184 bytes. The demuxer 108 can immediately de-obfuscate the entire TSPacket before it is passed to the next stage for any further processing.

c. The TSPacket's PID shows that this particular TSPacket is a PAT (Program Associate Table), i.e., does not carry video data. The demuxer 108 can immediately de-obfuscate the entire TSPacket before it is passed to the next stage for any further processing.

d. The TSPacket's PID shows that this particular TSPacket is a PMT (Program Map Table), i.e., does not carry video data. The demuxer 108 can immediately de-obfuscate the entire TSPacket before it is passed to the next stage for any further processing.

e. The TSPacket header information shows that this particular TSPacket has the "ContainsPESHeader" flag set to true, which implies that the payload contains information on timestamps, etc., and is not a pure video data TSPacket, and the video data will be shorter than 184 bytes. The demuxer 108 can immediately de-obfuscate the entire TSPacket before it is passed to the next stage for any further processing.

f. The TSPacket's PID and chunk type information shows that this TSPacket is an audio packet, the demuxer 108 can immediately de-obfuscate it since there is no interest in protecting audio packets as an asset.

g. The TSPacket's PID and chunk type information shows that this TSPacket is a video packet, the video packet has 184 bytes in payload length, but this is not the $R^{th}$ TSPacket that meets this criteria, then the demuxer 108 de-obfuscates the entire TSPacket.

After all the above criteria are processed, the player 100 only retains the obfuscation of the $R^{th}$ TSPacket's with video data length=184 in each H264 video frame. The player 100 will keep track of the location of the start position of the obfuscation and the length (in bytes) of the obfuscation using the data structure (Obj_Position, Obj_Length), although the Obj_Length is now always =184.

This modification helps the player 100 protect the video frame with the location of obfuscation being random and it also manages to resolve the Captions Data that was buried inside the video frame data.

The player 100 uses the fact that Captions Data always comes with the ContainsPESHeader flag set to true, which is criteria (e) above. In this case, there will never be Caption Data buried inside obfuscated data within each H264 video frame. This also ensures that the de-obfuscation processing is minimized in the video decoder 110 (which is the most time critical function in the player 100), since only 184 bytes need to be de-obfuscated.

Hardware Environment

Figure 9:
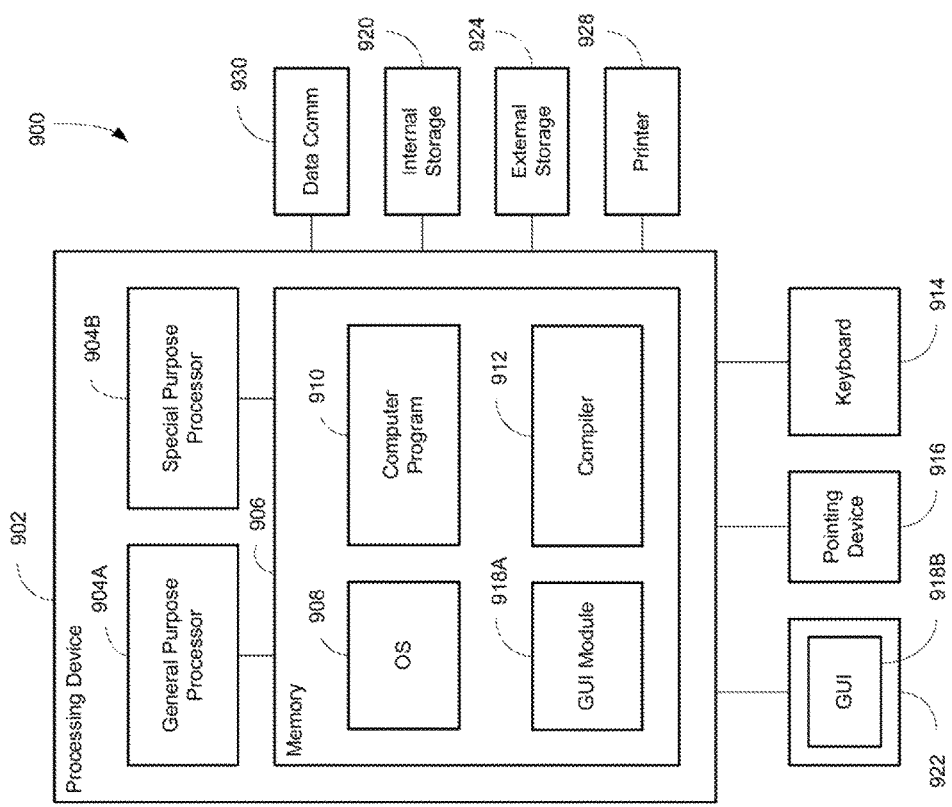
FIG. 9 is a diagram illustrating an exemplary computer system that could be used to implement elements of the present invention, including elements of a playback device.

FIG. 9 is a diagram illustrating an exemplary computer system 900 that could be used to implement elements of the present invention, including the player 100. The computer system 900 includes a processing device such as a computer 902, which comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, when implementing the player 100, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device, which could include an internal storage device 920 or external storage device 924 in the form of one or more fixed or removable data storage devices, such as a zip drive, floppy disc drive, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of processing a compressed and encrypted video media program, comprising:
    processing at least a portion of the video media program in a video player that includes a computer processor for processing at least a portion of the video media program, the video player operable for:
        receiving the media stream, wherein the video media stream is comprised of one or more chunks;
        subdividing the chunks into one or more packets, wherein one or more of the packets include video data;
        obfuscating or de-obfuscating at least some of the video data, wherein the step of obfuscating or de-obfuscating comprises obfuscating or de-obfuscating the video data using a caption handling with skip and select approach where only the video data in a first set of packets is de-obfuscated so that caption data is extracted; and
        concatenating the video data into one or more frames for playback by the video player.

2. The method of claim 1, wherein the frame is stored in a queue after the video data is concatenated, prior to being decoded and rendered by the player.

3. The method of claim 2, wherein the video data is de-obfuscated when the frame is retrieved from the queue prior to being decoded and rendered by the player.

4. The method of claim 1, wherein the video data is obfuscated or de-obfuscated before being concatenated.

5. The method of claim 1, wherein the video data is obfuscated or de-obfuscated after being concatenated.

6. The method of claim 1, wherein the chunks in the media stream are obfuscated before being transmitted to the player.

7. The method of claim 1, wherein the chunks in the media stream are encrypted before being transmitted to the player.

8. The method of claim 1, wherein the step of obfuscating or de-obfuscating is performed using an n-tuple bijection function and n is configurable.

9. The method of claim 1, wherein the step of obfuscating or de-obfuscating comprises obfuscating or de-obfuscating the video data using an odd and even approach where only the video data in an odd or even numbered frame is obfuscated or de-obfuscated.

10. The method of claim 1, wherein the step of obfuscating or de-obfuscating comprises obfuscating or de-obfuscating the video data using a skip and select approach where only the video data in one or more of the packets is obfuscated or de-obfuscated.

11. The method of claim 10, wherein only a portion of the video data in one or more of the packets is obfuscated or de-obfuscated.

12. The method of claim 10, wherein the step of obfuscating or de-obfuscating is performed using an n-tuple bijection function, n is a periodicity of obfuscation, and only a first occurrence of a packet with a data length divisible by the periodicity of obfuscation is obfuscated or de-obfuscated.

13. The method of claim 12, wherein a header of the packet is de-obfuscated to determine whether the packet has a data length divisible by the periodicity of obfuscation.

14. The method of claim 1, wherein the step of obfuscating or de-obfuscating is performed using an n-tuple bijection function, n is a periodicity of obfuscation, and only a first occurrence of a packet following the caption data with a data length divisible by the periodicity of obfuscation is obfuscated or de-obfuscated.

15. The method of claim 1, wherein only a packet identified by a pseudo-random number is obfuscated or de-obfuscated.

16. The method of claim 1, wherein packets not containing video data are de-obfuscated.

17. The method of claim 1, wherein packets not solely containing video data are de-obfuscated.

* * * * *